United States Patent [19]

Hashemi et al.

[11] Patent Number: 5,455,914
[45] Date of Patent: Oct. 3, 1995

[54] TIE-BREAKING CONTROL CIRCUIT FOR BUS MODULES WHICH SHARE COMMAND EXECUTION

[75] Inventors: Seyed H. Hashemi; Richard M. Linnell, both of Mission Viejo, Calif.

[73] Assignee: Unisys Corporation, Blue Bell, Pa.

[21] Appl. No.: 97,253

[22] Filed: Jul. 23, 1993

[51] Int. Cl.[6] ..................................................... G06F 13/00
[52] U.S. Cl. ..................... 395/200.01; 395/288; 395/304; 364/131; 364/942
[58] Field of Search .................................. 395/725, 325, 395/200, 650; 364/131, 942

[56] References Cited

U.S. PATENT DOCUMENTS

| | | | |
|---|---|---|---|
| 3,676,860 | 7/1972 | Collier | 340/172 |
| 4,805,106 | 2/1989 | Pfeifer | 364/200 |
| 4,858,101 | 8/1989 | Stewart | 364/131 |
| 4,888,684 | 12/1989 | Lilja | 364/200 |
| 5,072,374 | 12/1991 | Sexton | 395/800 |
| 5,276,886 | 1/1994 | Dror | 395/725 |
| 5,313,386 | 5/1994 | Cook | 364/187 |

Primary Examiner—Jack B. Harvey
Assistant Examiner—John Travis
Attorney, Agent, or Firm—Charles J. Fassbender; Mark T. Starr; Robert R. Axenfeld

[57] ABSTRACT

In a data processing system, a command sending module sends a command over a bus to two command executing modules at the same time, and that command is to be performed by either one, but not both, of the command executing modules. To ensure that only one of the command executing modules executes the command, they each include a tie-breaking control circuit which is comprised of: a) a storage circuit that initially stores a first control code upon the receipt of the command; b) a bus acquisition circuit which requests and subsequently obtains the use of the bus in response to the receipt of the command; c) a write circuit which changes the first control code to a second control code in the storage circuit if an acceptance message is received from the other command executing module between requesting and obtaining the bus; and, d) a conditional message sending circuit which, while the bus is obtained, senses the content of the storage circuit and sends the acceptance message on the bus only if the sensed content is the first control code.

11 Claims, 3 Drawing Sheets

TIE-BREAKING CONTROL CIRCUIT FOR BUS MODULES WHICH SHARE COMMAND EXECUTION

BACKGROUND OF THE INVENTION

This invention relates to data processing systems in which multiple data processing modules are inter-coupled to each other over a time-shared bus; and more particularly, it relates to methods and apparatus by which two of the modules in such a system share in the execution of commands which are sent to them over the bus.

In the prior art, data processing systems have been disclosed in which one module A sends commands over a bus to two other modules B and C for execution. However, a difficulty arises when module A sends the same command to both of the other modules B and C simultaneously, and only one of the modules B or C is permitted to execute that command. In that case, some method and apparatus is needed to insure that the command is executed by one, but not both, of the modules B and C.

Previously, the above problem was solved by providing a memory module on the bus and providing the bus with the ability to perform a Read-Modify-Write operation. This memory module stored a respective flag for each command; and, each of the modules B and C used the Read-Modify-Write operation to read, test, and modify the flags such that each command was performed by a just one module B or C.

Suppose, for example, that module B sought to execute a command. In that case module B initiated the Read-Modify-Write by sending a message to the memory which identified the particular command that was to be executed. In response on the next bus cycle, the memory sent an internally stored flag back to module B which indicated whether or not module C has already started the execution of that command. If the flag indicated that module C had not begun to execute the command, then on the next bus cycle, module B sent a modified flag back to the memory where it replaced the initially read flag. This modified flag indicated that module B would perform the command.

Likewise, module C could initiate the Read-Modify-Write operation in the same fashion. In that case, on the first bus cycle, module C sent a message to the memory which identified the command that was to be executed. In response, on the second bus cycle, the memory sent an internally stored flag back to module C which indicated whether or not module B has already started the execution of the command. Then, if module B has not started to perform the command, module C on the third bus cycle sent a modified flag back to the memory for storage therein which indicated that module C would perform the command.

One drawback, however, with the above described Read-Modify-Write operation is that it requires three consecutive bus transactions or bus cycles. Consequently, the Read-Modify-Write operation is relatively slow in comparison to a single cycle bus operation, such as the sending of one message on the bus from module B to module C.

Another drawback is that during the three bus cycles of a Read-Modify-Write, only one module B or C, together with the memory can use the bus. However, for some particular data processing systems, being locked off of the bus for three consecutive bus cycles is not tolerable.

Still another drawback is that in many existing data processing systems, the bus is unable to perform a Read-Modify-Write (i.e.—the bus does not have the ability to lock out all modules except one for three consecutive bus cycles). Thus, for those systems, the modules B and C which share in the execution of a command cannot be added to the system as an upgrade.

Accordingly, a primary object of the present invention is to provide a novel method and control circuit by which two modules on a time-shared bus share in the execution of a command without requiring any Read-Modify-Write operation.

Also, another object of the present invention is to provide a method and control circuit by which two modules on a time-shared bus share in the execution of a command by requiring only a single bus transaction or bus cycle between those modules.

BRIEF SUMMARY OF THE INVENTION

One preferred embodiment of the present invention comprises a data processing system having a time shared bus, a command sending module which is coupled to the bus, and first and second command executing modules which are also coupled to the bus. In operation, the command sending module sends a command over the bus to both of the command executing modules at the same time, and that command specifies an operation to be performed by either one, but not both, of the command executing modules. Further, in accordance with the present invention, each of the command executing modules includes a tie-breaking control circuit which ensures that only one of those modules execute the command. This tie-breaking control circuit is comprised of: a) a storage circuit that initially stores a first control code upon the receipt of the command; b) a bus acquisition circuit which requests and subsequently obtains the use of the bus in response to the receipt of the command; c) a write circuit which changes the first control code to a second control code in the storage circuit if an acceptance message is received from the other command executing module between requesting and obtaining the bus; and, d) a conditional message sending circuit which, while the bus is obtained, senses the content of the storage circuit and sends the acceptance message on the bus to the other command executing module only if the sensed content is the first control code. Through the use of this tie-breaking control circuit, the resolution of which command executing module should perform a command involves only a single bus transaction—i.e., the conditional sending of the acceptance message.

BRIEF DESCRIPTION OF THE DRAWINGS

All of the structural and operational details of the present invention are described herein in conjunction with the accompanying drawings wherein.

DETAILED DESCRIPTION

Figure 1:
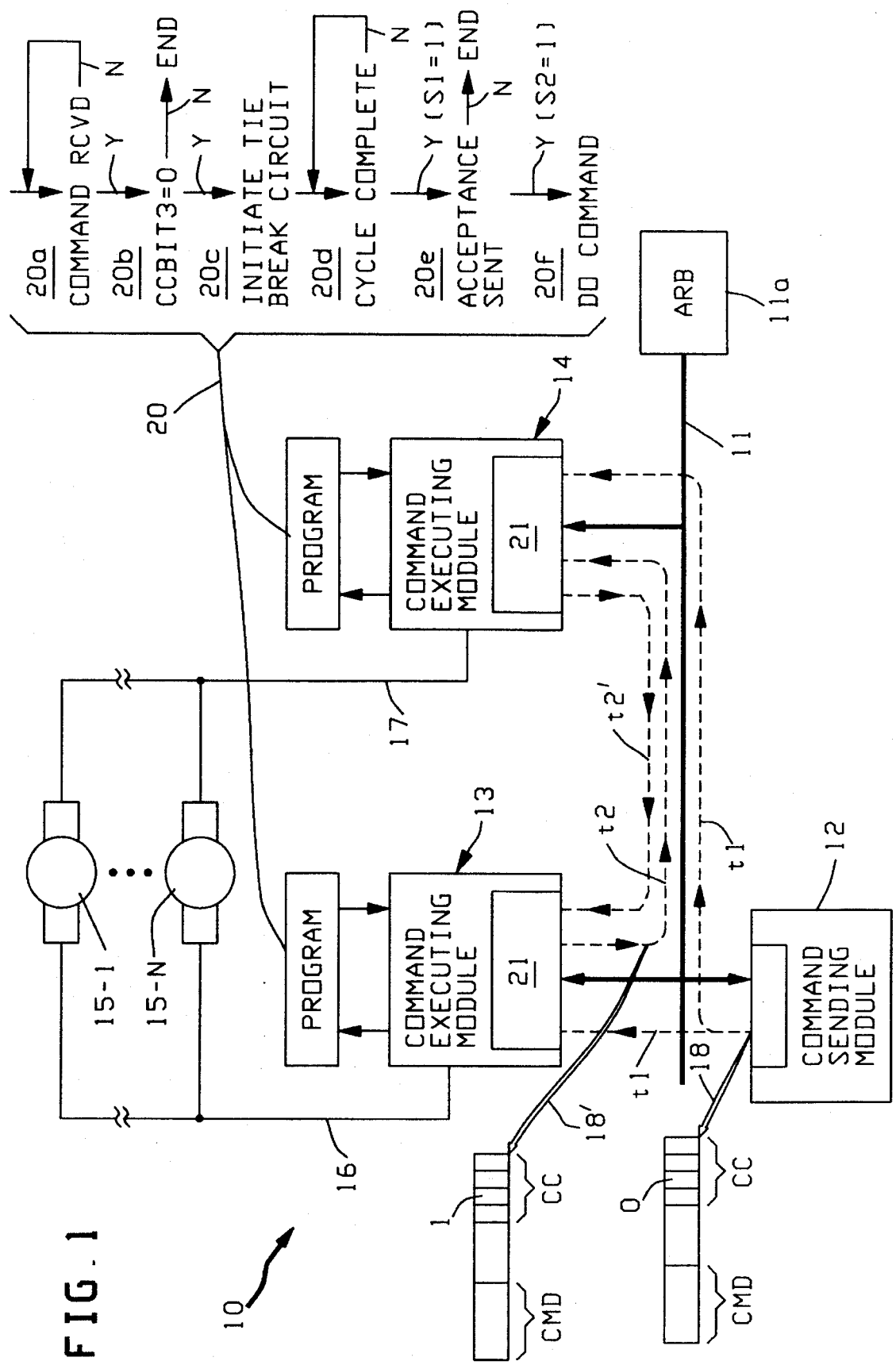
FIG. 1 is an overview of a data processing system which constitutes one preferred embodiment of the present invention.

Referring now to FIG. 1, it shows a data processing system 10 which constitutes one preferred embodiment of the present invention. This data processing system 10 includes a bus 11 and three modules 12, 13, and 14 which are coupled to the bus. Access to the bus 11 is allocated on a time-shared basis by a bus arbiter 11a which receives respective bus request signals from and sends respective bus grant signals to each of the modules 12–14. Module 12 is a command sending module which sends commands over the bus 11 to the modules 13 and 14, and the modules 13 and 14 are command executing modules which execute the commands from module 12.

Further included in the FIG. 1 system are a set of dual-port disks 15-1 thru 15-N. Those disks have one port coupled via a cable 16 to the command executing module 13, and they have another port coupled via a cable 17 to the command executing module 14. Each of the disks 15-1 thru 15-N store various data records which are selectively read and written by the command executing modules 13 and 14 in response to the commands from module 12.

In the FIG. 1 system, commands from the command sending module 12 are sent over the bus 11 to both of the command executing modules 13 and 14 simultaneously. One such simultaneous transfer of a command is shown as occurring at time instant t1. However, even though both of the command executing modules 13 and 14 receive the command, only one of those modules is allowed to execute the command.

For example, suppose module 12 sends a command to the command executing modules 13 and 14 which specifies that a particular data record R123 on the disk 15-1 is to be written with new data. In that case, either module 13 or module 14 (but not both of those modules) can write the data record R123 on the disk 15-1.

Throughout the operation of the FIG. 1 system, similar commands are sent at random times from module 12 to the modules 13 and 14 where they are stored temporarily and subsequently executed in whatever order the modules 13 and 14 happen to become available. For example, module 13 might perform the first command while module 14 performs the second command; then if module 14 completes the execution of the second command while module 13 is busy, then module 14 will start the execution of the third command; then if module 13 completes the execution of the first command while module 14 is busy, module 13 will start the execution of the fourth command; etc.

Now in order to insure that both of the modules 13 and 14 do not execute the same command, the FIG. 1 system operates as follows. Each command from module 12 to the modules 13 and 14 is sent with a format 18 which includes a control code. This format is shown in FIG. 1 wherein CMD represents a command and CC represents the control code. In this illustrated embodiment, the control code consists of four bits; and initially, the third bit from the right is a "0".

Each command and its associated command code are stored in both of the command executing modules 13 and 14. Thereafter, when one of the modules 13 or 14 becomes ready to start the execution of a command, that module first executes a control program 20 which is stored within the module and which specifies a series of steps 20a–20f as follows.

In step 20a, the command executing module 13 or 14 checks to see if any command has been received which remains to be executed. If such a command has been received, then the command executing module checks via step 20b to see if bit three of the associated control code equals "0". If bit three does equal "0", then by step 20c, the command executing module activates a tie-breaking circuit 21 which forms a key portion of the module and which is described in detail herein in conjunction with FIGS. 2 and 3.

Briefly however, when the tie-breaking circuit 21 is activated in for example module 13, it sends a bus request signal to the arbiter 11a; and in response, the arbiter eventually sends back a bus grant signal which indicates that the bus can be used. When the use of the bus is so obtained by the circuit 21 in module 13, it conditionally sends an acceptance message with a format 18' to the other command executing module 14. Format 18' is the same as the previously described format 18 with the exception that the third bit in the control code is a "1" instead of a "0". If the modified control code is sent, it replaces the initial control code in the command executing module 14; and thus, when module 14 executes step 20b of its control program 20, it will bypass the corresponding command.

Such sending of an acceptance message with the format 18' from module 13 to module 14 is illustrated in FIG. 1 as occurring at time instant t2. However, at approximately the same time t2', module 14 may also be attempting to send the same acceptance message with the format 18' to module 13. This situation will arise when both of the modules 13 and 14 happen to execute step 20b of the program 20 at approximately the same time. In that case, both of the modules 13 and 14 will find bit three of the control code to be in its initial "0" state; and thus both of the modules 13 and 14 will activate their tie-breaking circuit 21 in an attempt to change bit three of the control code in the other module.

If the bus arbiter 11a happens to grant the use of the bus to module 13 before it grants the bus to module 14, then the tie-breaking circuit 21 in module 13 will send the acceptance message with format 18' to module 14; but the tie-breaking circuit 21 in module 14 will not send any message to module 13. Conversely, if the bus arbiter grants the use of the bus to module 14 before it grants the bus to module 13, then circuit 21 in module 14 will send the acceptance message with the format 18' to module 13; but circuit 21 in module 13 will not send any message to module 14.

After circuit 21 is granted the use of bus 11, that circuit sets a pair of status bits S1 and S2. Status bit S1 is tested by step 20d of the program 20, and it indicates that circuit 21 has completed its operation. Then, status bit S2 is tested by step 20e of the program 20, and it indicates whether or not the acceptance message with format 18' was sent. If a module 13 or 14 sends the acceptance message, then it executes the command CMD.

Figure 2:
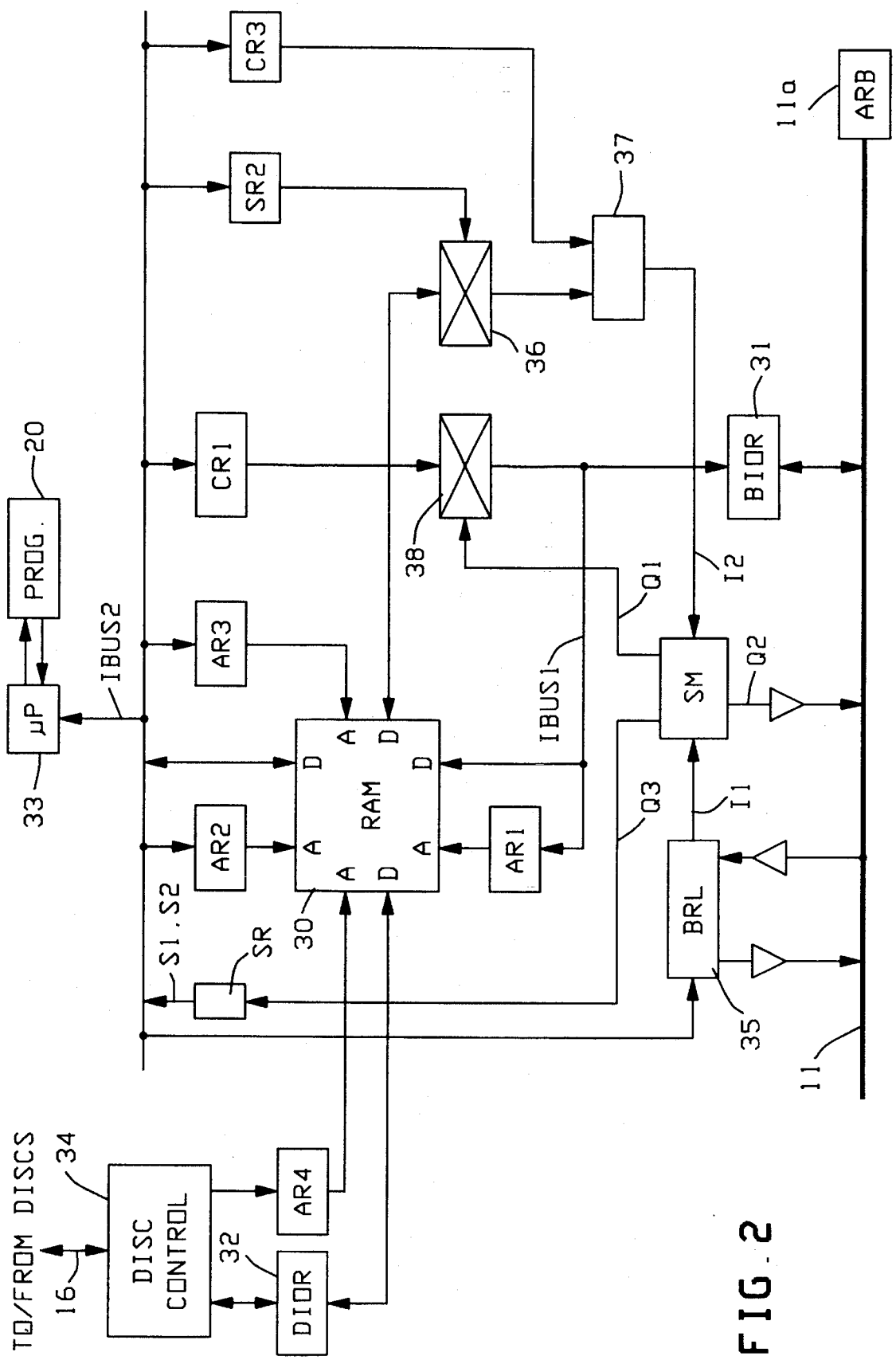
FIG. 2 shows in greater detail, the internal circuitry of each of two command executing modules in the FIG. 1 system; and, FIG. 3 shows how the FIG. 2 circuitry operates to insure that each particular command which is sent in the FIG. 1 system is executed by only one module.

Turning now to FIG. 2, the internal circuitry of the command executing modules 13 and 14 will be described in further detail. All of the circuit components in FIG. 2 together constitute a single command executing module 13 or 14. Those components are listed below in Table 1, and they are interconnected as shown in FIG. 2.

TABLE 1

| Ref # | Description |
| --- | --- |
| 30 | four port Random Access Memory having address inputs A and data inputs D |
| AR1 | Address register for port 1 of memory 30 |
| AR2 | Address register for port 2 of memory 30 |
| AR3 | Address register for port 3 of memory 30 |
| AR4 | Address register for port 4 of memory 30 |
| 31 | Bus Input/Output register (BIOR) |
| 32 | Disc Input/Output register (DIOR) |
| 33 | microprocessor (uP) |

TABLE 1-continued

| Ref # | Description |
| --- | --- |
| 34 | disc controller |
| CR1 | control register #1 |
| CR2 | control register #2 |
| CR3 | control register #3 |
| SR | status resister |
| 35 | bus request logic |
| 36 | multiplexor |
| 37 | compare logic |
| 38 | multiplexor |
| 39 | state machine (SM) for conditionally sending a bus acceptance message |
| IBUS1 | internal bus #1 |
| IBUS2 | internal bus #2 |

Figure 3:
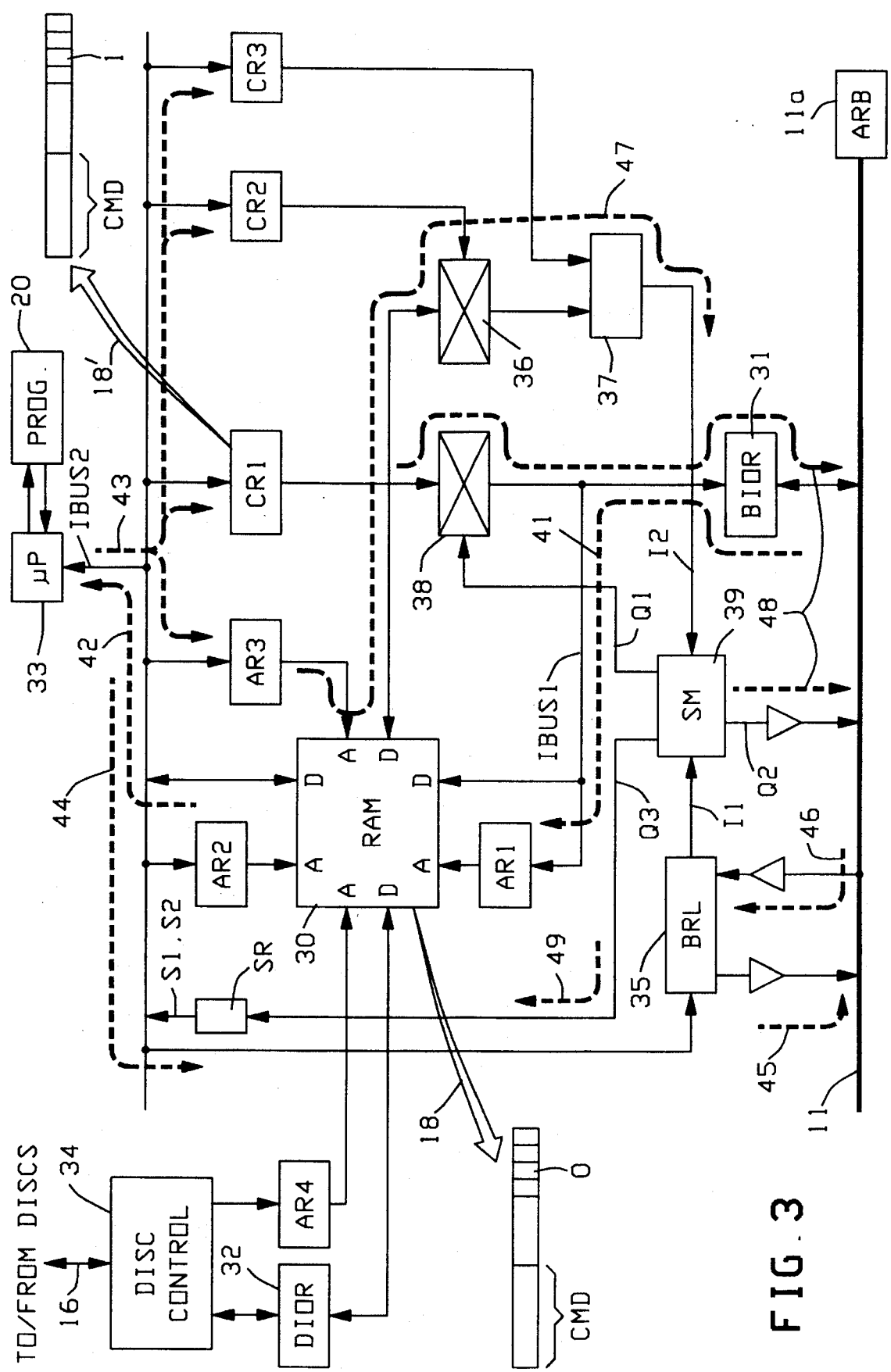

How the FIG. 2 circuitry operates to receive commands from the command sending module and to execute a command only if it has not been previously accepted by another command executing module is illustrated in FIG. 3. That figure is the same as FIG. 2 except that it also includes a set of dashed lines 41 thru 49 which identify various signal paths and the sequence by which they are used.

Initially, as illustrated by the dashed line 41, a command is received via the bus 11 from the command sending module, and that command passes from the bus input/output register 31 to the random access memory 30. This command has the previously described format 18 which is again shown in FIG. 3.

Thereafter, as indicated by the dashed line 42, the microprocessor 33 reads the command from the memory 30 and tests bit three of the control code. If that bit is a "1", then the command is ignored; whereas if that bit is a "0", then the micro-processor 33 loads the registers AR3, CR1, CR2, and CR3 as indicated by the dashed lines 43.

In the address register AR3, the micro-processor 33 loads the address of the storage location in memory 30 which holds the command that it just previously read. In the control register CR1, the micro-processor 33 loads the acceptance message 18' which is the same as the command format 18 except that bit three of the control code is a "1" instead of a "0". In control register CR2, the microprocessor loads a number which causes the multiplexor 36 to pass the third bit in the control code that is being read from the RAM 30 by address register AR3. And, in the control register CR3, the micro-processor loads a "0" bit.

Next, as indicated by the dashed line 44, the microprocessor 33 sends a start signal to the bus request logic 35; and in response, the bus request logic 35 initiates a request to use the bus as indicated by the dashed line 45.

Thereafter, in response to the bus request, the bus arbiter 11a eventually responds with a bus grant signal. This is indicated by the dashed line 46. When that occurs, the bus request logic 35 sends input signal I1 to the state machine 39.

State machine 39 receives a total of two input signals I1 and I2 and it generates a total of three output signals O1, O2, and O3. Upon receiving the signal I1, the state machine 39 examines its other input signal I2. If the third bit of the addressed control code in the RAM 30 is a "0" when the bus is granted, then the signal I2 is "1"; whereas if the third bit of the addressed control code in the RAM is a "1" when the bus is granted, then the signal I2 is "0".

Here, an important point is that the address register AR3 continuously addresses the control code in the RAM 30, and thus the latest state of that control code is sent through the multiplexor 36 to the compare logic 37. Consequently, if the control code which is addressed by address register AR3 got changed at any time between its reading per the dashed lines 42 and the receipt of the bus grant per the dashed lines 46, that change will be indicated by the signal I2. Such a change will occur if an acceptance message is received from the other command executing module.

When both inputs to the comparator 37 are equal, the signal I2 is "1". In that case, as indicated by the dashed lines 48, the state machine 39 generates —a) output signal O1 which causes the command with format 18' to pass from the control register CR1 through the multiplexor 38 and bus input/output register 31 to the bus 11; and b) output signal O2 which goes on the bus 11 to indicate that the bus input/output register 31 should be received by the other command executing module. Conversely, if signal I2 is a "0", the state machine 39 simply bypasses its opportunity to use the bus 11 by not sending the output signal O2.

Thereafter, as indicated by the dashed lines 49, the state machine 39 generates its output signal O3 which loads the status register SR with the status bits S1 and S2. Status bit S1 is set to a "1" to indicate that the cycle on the bus 11 is complete; and, status bit S2 is set to a "1" only if the acceptance message 18' was actually sent to the other command executing module (i.e.—only if the state machine output signal O2 was generated).

After the status register SR is loaded, the status bits S1 and S2 are sensed by the microprocessor 33. Then, if status bit S2 is a "1", the microprocessor 33 will proceed by performing the command. In the performance of a read command, data passes from a disc through the disc controller 34, the disc input/output register 32, the RAM 30, and the bus input/output register 31. In the performance of a write command, data passes in the opposite direction.

One important feature of the above described operation is that only a single bus transaction was used to determine which of the modules 13 or 14 should perform a particular command. That single bus transaction is indicated by the dashed lines 48.

A second important feature of the above described operation is that it does not require any Read-Modify-Write. Thus, the Modules 12, 13, and 14 can be added to an existing data processing system in which the bus is not capable of performing a Read-Modify-Write.

Various preferred embodiments of the invention have now been described in detail. In addition, however, many changes and modifications can be made to these embodiments without departing from the nature and spirit of the invention.

For example, instead of using the third bit of the control code to indicate whether or not the associated command will be performed by a particular command executing module, any other bit in the control code can be used to perform that function. If the ith bit is used (i=1 or 2 or 3 or 4) then during the operation that is indicated by the dashed lines 43, the processor 33 will —a) load the control register CR2 with a number which causes the multiplexor 36 to select the ith bit of the control code and b) load the control register CR1 with a control code in which the ith bit is a "1".

Similarly, a combination of several bits in the control code rather than a single bit may be used to indicate whether or not the associated command will be performed by a particular command executing module. For example, the entire control code may initially be 1010; and that initial control code be changed by an acceptance message to 0101. In that case, a) the multiplexor 36 would be modified to pass all four bits of the control code, b) the comparator 37 would be modified to compare the four bit control code which passes through the multiplexor 36 to four other bits in the control register CR3, and c) the control code which is loaded into the control register CR1 would be 1010.

As another variation, the formats with which a command and the control code are sent over the bus 11 can be changed from those shown by reference numerals 18 and 18' to any other predetermined format. For example, the command can contain any number of bits; the control code can contain any number of bits; and the command can have any position relative to the control code.

As still another variation, the initial state of the control code that is to be stored in the RAM 30 when a command is received can be implied rather than actually transferred on the bus 11 along with the command. For example, each time a command is received from the bus and stored in the RAM 30 as indicated by the dashed lines 41, an "XOXX" code can be stored in the RAM 30 along with command even though no such code is sent on the bus. Thereafter, all of the other previously described operations associated with the dashed lines 42–49 remain the same. Likewise, the modified control code (e.g.—"X1XX") can be implied from the receipt of any acceptance command; and thus the actual modified control code need not be sent on the bus 11.

Also, as another variation, any type of supplemental information can be sent on the bus along with the command. For example, that supplemental information can include an identification of the command sending module 12, an address for the location in the RAM 30 in which the command and the control code are to be stored, etc.

As yet another variation, the bus 11 can have any physical structure and protocol so long as the bus is time-shared. For example, the bus can be of a type in which its use is allocated in time intervals of a fixed and predetermined duration such as one bus cycle per bus grant. Alternatively, the bus 11 can be of a type in which its use is allocated in variable time intervals with each module generating a bus release signal that indicates when it is through with the bus.

Also, as still another variation, the state machine 39 can be implemented with several types of circuits. For example, the state machine 39 can be one or more of the PLUS405-55 Field-Programmable Logic Sequencer integrated circuit chips from Signetics Corporation which are programmed to receive the input signals I1 and I2 and generate the output signals 01, 02, and 03 as previously described. Alternatively, the state machine 39 can be constructed of discrete logic and memory components. Likewise, the bus request logic 35 can be implemented with similar circuits.

As another variation, the micro-processor 33 can be any one of several commercially available microprocessor chips. Suitably, the micro-processor 33 is an AMD29000 from Advanced Micro Devices Corporation or a 88100 from Motorola Corporation.

As still another variation, the FIG. 1 system can include more than one command sending module 12. Likewise, the FIG. 1 system can include more than two command executing modules 13 and 14.

As still one other variation, the second status bit S2 can be eliminated; and in its place, the control code which is stored in the RAM 30 can be re-read and re-tested after the tie-breaking circuit 21 has completed its cycle as indicated by the status bit S1. This re-reading and re-testing would be done by step 20e of the FIG. 1 program 20. If this modified step 20e finds the initial control code is still in the RAM 30, then the corresponding command needs to be executed. But if this modified step 20e finds a modified control code in the RAM 30, then another module has already begun to execute the command.

Accordingly, in view of the above variations and modifications, it is to be understood that the invention of this application is not limited to any one particular embodiment but is defined by the appended claims.

What is claimed is:

1. A data processing system comprising:

a time shared bus, a command sending module coupled to said bus, and first and second command executing modules also coupled to said bus;

said command sending module including a circuit which sends a command over said bus to both of said command executing modules at the same time, with said command specifying an operation to be performed by either one, but not both, of said command executing modules;

each of said command executing modules having a tie-breaking control circuit which includes—
 a) a storage circuit that stores an initial control code upon the receipt of said command;
 b) a bus acquisition circuit which requests and subsequently obtains the use of said bus in response to the receipt of said command;
 c) a write circuit which changes said initial control code in said storage circuit to a second control code if an acceptance message is received over said bus from the other command executing module between the requesting and obtaining of said bus;
 d) a conditional message sending circuit which, while said bus is obtained, senses the content of said storage circuit and sends the acceptance message on said bus to the other command executing module only if the sensed content is said initial control code; and,
 e) a status circuit which is set, by said conditional message sending circuit, to a state that indicates whether or not said acceptance message was sent when said bus was obtained.

2. A data processing system according to claim 1 wherein said initial control code is sent on said bus with said command.

3. A data processing system according to claim 1 wherein said initial control code is fixed and is not sent on said bus with said command.

4. A data processing system according to claim 1 wherein to send a single message on said bus from one command executing module to the other takes a particular time period, and wherein said conditional message sending circuit senses the content of said storage circuit and sends said acceptance message on said bus in less than twice said time period.

5. A module which couples to a time shared bus; said module comprising:

a bus acquisition circuit which requests and subsequently obtains the use of said bus;

a tie-breaking control circuit, having an input that receives an externally generated control signal that has true and false states, which senses said control signal while said bus is obtained and sends a message on said bus only if the sensed signal has a true state; and, a status register which is set, by said control circuit, to a state that indicates whether or not said message was sent after said bus is obtained.

6. A module according to claim 5 which further includes a logic circuit which initially generates said control signal in said true state, and changes said control signal to said false state if another message identical to said message is received over said bus between the requesting and obtaining of said bus by said bus acquisition circuit.

7. A module according to claim 6 wherein said logic circuit includes a storage circuit which stores an initial control code that generates the true state of said control signal, and a write circuit which changes said initial control code to a second control code if said another message is received over said bus between the requesting and obtaining of said bus.

8. A module according to claim 7 wherein said initial control code is stored in response to the receipt of a command from said bus.

9. A module according to claim 8 wherein said initial control code is received along with said command from said bus.

10. A module according to claim 9 wherein to send a single message on said bus takes a particular time period, and wherein said control circuit senses one of said control codes in said storage circuit and sends said message on said bus in less than twice said time period.

11. A module according to claim 10 wherein said control circuit includes a state machine which receives said control signal and which sends said message on said bus based on the state of said control signal.

* * * * *